(No Model.) 4 Sheets—Sheet 1.

A. H. BRAINARD & Z. B. COES.
AUTOMATIC GEAR CUTTING MACHINE.

No. 310,247. Patented Jan. 6, 1885.

WITNESSES.
S. Robin
Henry Chadbourn

INVENTORS.
Amos H. Brainard
and
Lorester B. Coes.
by Albans Andrew their atty (No Model.) 4 Sheets—Sheet 2.

A. H. BRAINARD & Z. B. COES.
AUTOMATIC GEAR CUTTING MACHINE.

No. 310,247. Patented Jan. 6, 1885.

WITNESSES.
S. Robin
Henry Chadbourn.

INVENTORS.
Amos H. Brainard
and
Lorester B. Coes.
by Alban Andrew their atty

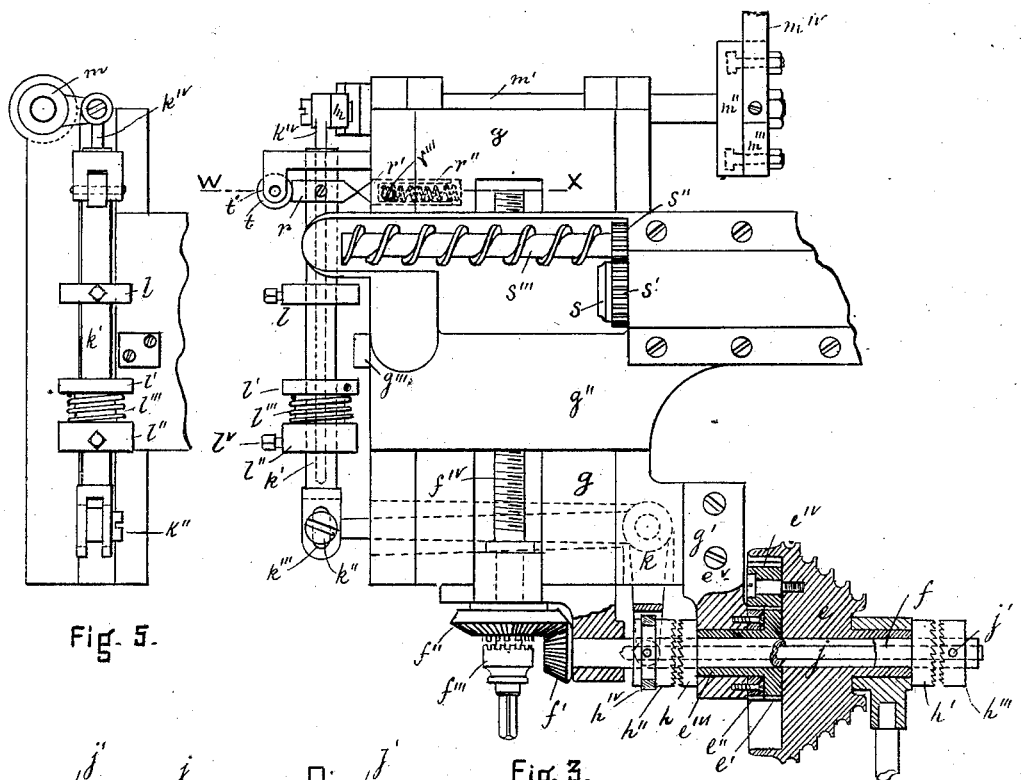
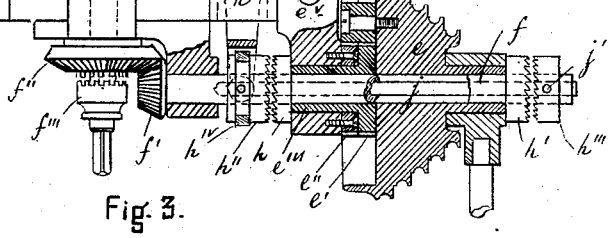
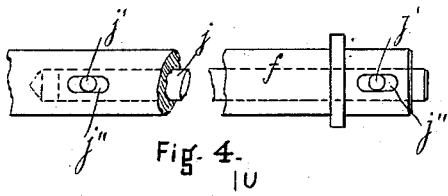
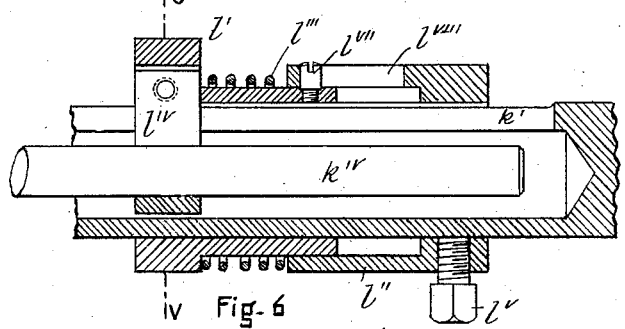
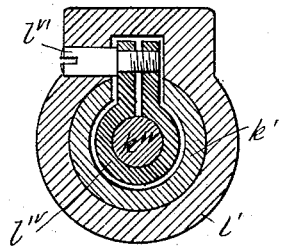

(No Model.)  4 Sheets—Sheet 4.

A. H. BRAINARD & Z. B. COES.
AUTOMATIC GEAR CUTTING MACHINE.

No. 310,247.  Patented Jan. 6, 1885.

WITNESSES.
S. Robin
Henry Chadbourn

INVENTORS.
Amos H. Brainard
and
Zorester B. Coes.
by Abban Andrew their atty

UNITED STATES PATENT OFFICE.

AMOS H. BRAINARD AND ZORESTER B. COES, OF HYDE PARK, MASSACHUSETTS; SAID COES ASSIGNOR TO SAID BRAINARD.

AUTOMATIC GEAR-CUTTING MACHINE.

SPECIFICATION forming part of Letters Patent No. 310,247, dated January 6, 1885.

Application filed February 6, 1884. (No model.)

*To all whom it may concern:*

Be it known that we, AMOS H. BRAINARD and ZORESTER B. COES, both citizens of the United States, and residing at Hyde Park, in the county of Norfolk and State of Massachusetts, have jointly invented certain new and useful Improvements in Automatic Gear-Cutting Machines; and we do hereby declare that the same are fully described in the following specification and illustrated in the accompanying drawings.

This invention relates to improvements in automatic gear-cutting machines, and it is carried out as follows, reference being had to the accompanying drawings, where—

Figure 1:
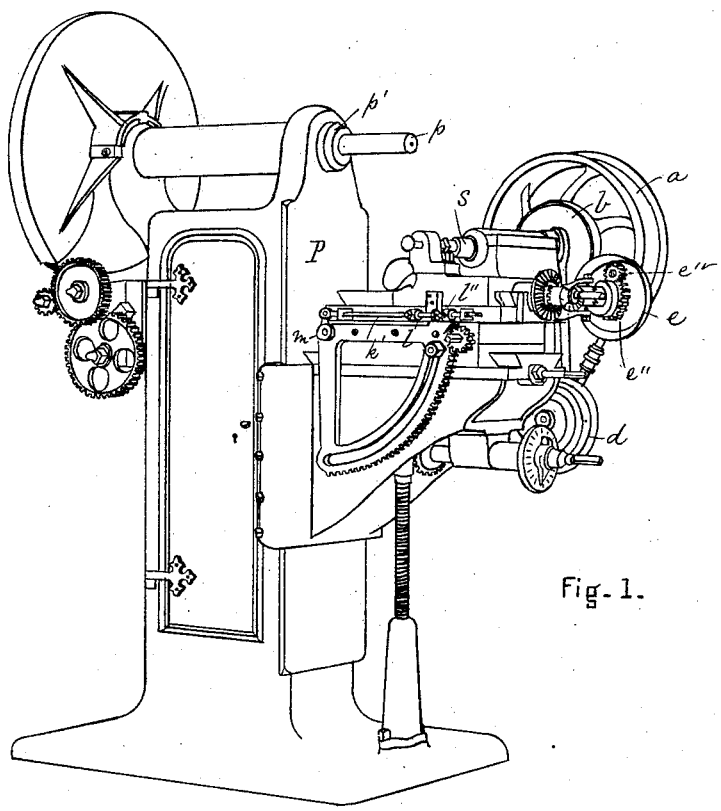
Figure 8:
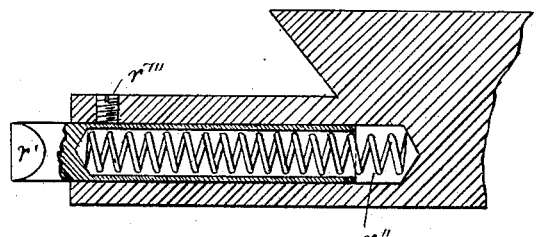
Figure 2:
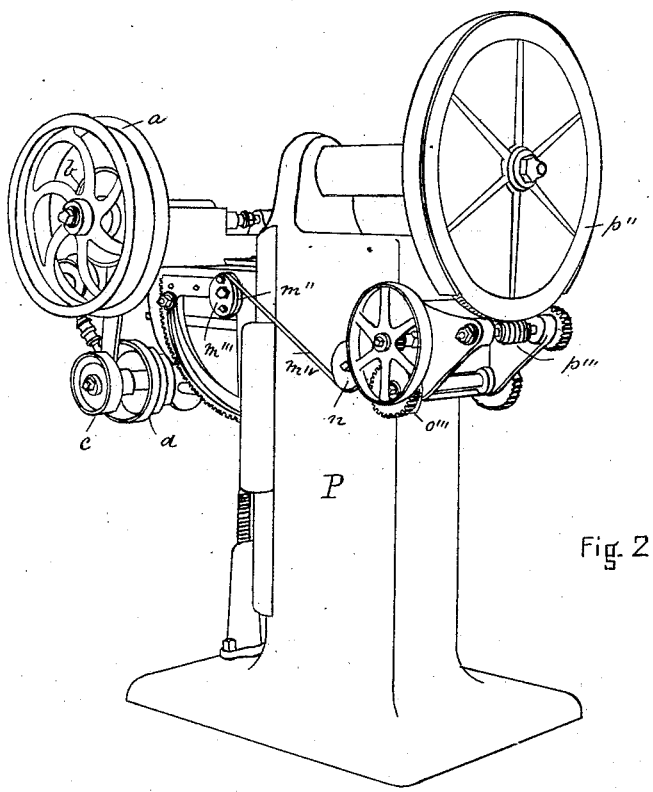
Figure 11:
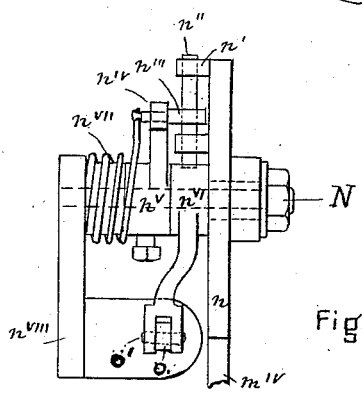
Figure 9:
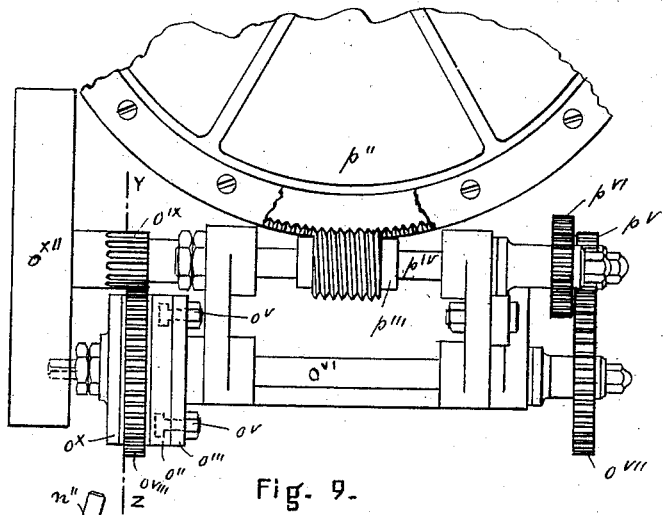
Figure 10:
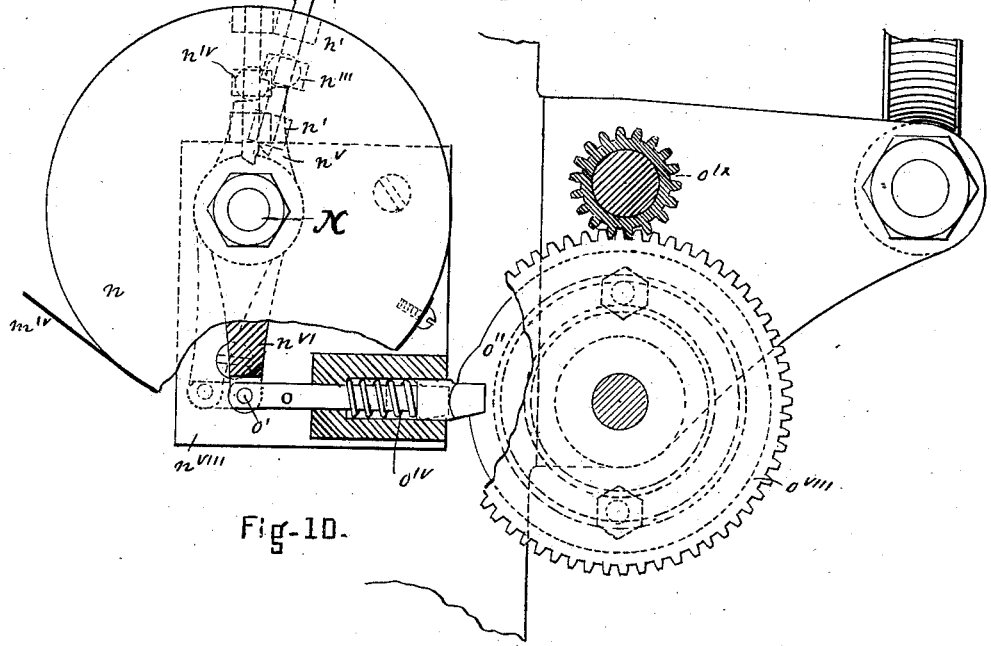

Figure 1 represents a front and Fig. 2 represents a rear perspective view of the machine. Fig. 3 represents a detail plan view of the cutter-slide, feed-motion, and device for removing chips made by the cutter. Fig. 4 represents an enlarged view of the feed-shaft shown in Fig. 3. Fig. 5 represents a detail side view of the feed and index shipper-rod and crank shown in Fig. 3. Fig. 6 represents an enlarged central longitudinal section of the compound feed and index dog and shipper-rod shown in Figs. 3 and 5. Fig. 7 represents a cross-section of the compound gear and index-dog on line U V, shown in Fig. 6. Fig. 8 represents a section of the feed-tripping latch on line W X in Fig. 3. Fig. 9 represents a detail rear view of the worm-wheel, its worm-shaft, and bracket, together with the change-gears for producing the divisions and frictional driving mechanism. Fig. 10 represents a partial elevation and section of the index-latch and frictional driving mechanism on line Y Z in Fig. 9. Fig. 11 represents a detail side view of the index-latch-tripping mechanism shown in Fig. 10.

Similar letters refer to similar parts wherever they occur on the different parts of the drawings.

This machine is of that class where the functions are entirely automatic. The gear-blank to be cut is placed on the spindle of the machine and the cutter adjusted to depth, and feed-dogs set for length of stroke, when the cutter will pass through the work and return at a quick speed, the index mechanism moving the blank from tooth to tooth and locking the blank securely at each operation.

In this machine are several devices for attaining and maintaining unusual accuracy and celerity of operation, as will hereinafter be more fully shown and described.

The machine is of same general form as described in Letters Patent No. 255,409, granted to A. H. Brainard March 28, 1882—a machine in which the feed only was automatic, the indexing being done by the operator.

This present improved machine is intended to supplement the machine described in said patent by use of the devices hereinafter to be described.

$a$ is the main driving-pulley of the machine, $b$ the feed-driving pulley, $c$ the feed-receiving pulley, and $d$ and $e$ the feed-cones. Cone-pulley $e$ is mounted loosely on hollow shaft $f$. $e'$ and $e''$ are two gears of equal diameter, but $e''$ has one more tooth than $e'$. $e''$ is fastened securely to a block, $g'$, secured to the cutter-slide bed $g$. $e'$ has a long hub, $e'''$, forming part of same, and is mounted loosely on shaft $f$, and passes through gear $e''$ and block $g'$.

$e^{IV}$ is a pinion pivoted loosely to the cone-pulley $e$ by screw $e^V$, and moves with the cone-pulley $e$, while engaging with the gears $e'$ and $e''$. This mechanism is such that when the cone-pulley $e$ moves in either direction the gear $e'$ moves in an opposite direction and at a much slower velocity, moving only one tooth for each revolution of the cone-pulley.

To the hub $e'''$ is securely fastened the ratchet-clutch $h$, while at the opposite end, on the hub of the cone-pulley $e$, is fastened another ratchet-clutch, $h'$.

$h''$ and $h'''$ are two clutches engaging alternately in $h$ and $h'$, and connected rigidly to the clutch-rod $j$ by the pins $j'$. This clutch-rod $j$ is free to move in feed-shaft $f$ by means of the slots $j''$.

To the end of feed-shaft $f$ is keyed a bevel-pinion, $f'$, engaging with its bevel-wheel $f''$, which, by means of the clutch $f'''$, communicates motion to the feed-screw $f^{IV}$, and thus to the cutter-slide $g''$.

On clutch $h''$ is placed a ring, $h^{IV}$, which is pivoted to shipping-lever $k$, that is pivoted to the slide-bed $g$. This lever at its other end is attached to the shipper-rod $k'$ by means of a screw, $k''$, playing in the slot $k'''$. The shipper-rod $k'$ carries the dogs $l$ and $l'$, which are adjustable on the shipper-rod $k'$, as shown. The dog $l'$ is a compound one, composed of the part $l''$, which is held to the shipper-rod $k'$ by a set-screw, $l^V$, and the sliding part $l'$, carrying the clamp $l^{IV}$, and kept in place by the spiral spring $l'''$ and screw $l^{VII}$, playing in the slot $l^{VIII}$, Figs. 6 and 7. The clamp $l^{IV}$ is adjusted on the index shipper-rod $k^{IV}$ by the set-screw $l^{VI}$, which also serves to connect $l^{IV}$ to $l'$. The index shipper-rod $k^{IV}$ is connected by the crank-arm $m$ and shaft $m'$ with the adjusting-plates $m'' m'''$. $m'''$ is adjustable on $m''$ by means of a T-slot and bolts. (Shown in Fig. 3.)

The object of slot $k$ in shipper-rod $k'$ is to allow the latter and its wedge-piece $r$ to pass by the apex-point of the tripping-latch $r'$ before the clutches $h h''$ become disengaged, as without such slot the cutter-slide $g''$ would come to a standstill immediately upon the disengagement of the clutches $h h''$. The shaft $m'$ is also the pivot about which the cutter-slide $g''$ is swung and adjusted for bevel-gear cutting.

To the plate $m'''$ is secured a steel ribbon, $m^{IV}$, which is connected at its other end with the index latch-plate $n$, Figs. 10 and 11. This plate carries on the inside surface two lugs, $n'$, which support a secondary latch-rod, $n''$, Figs. 10 and 11, that moves in the lugs $n'$.

To the rod $n''$ is fastened a stud-collar, $n'''$, carrying a roll, $n^{IV}$, which runs on a fixed cam, $n^V$.

Connected with the stud-collar $n'''$ is a coiled spring, $n^{VII}$, that has its other end fastened to the plate $n^{VIII}$, which supports the combination and is fastened to the frame of the machine. The latch-rod $n''$ engages with the hub of an arm, $n^{VI}$, mounted loosely on the same stud, N, as the latch-plate $n$, and is connected to the main index-latch $o$ by means of the pin $o'$. The latch $o$ engages with the disk $o''$, Figs. 9 and 10, which is fastened to the disk $o'''$ by a T-slot and bolts $o^V o^V$. $o'''$ is keyed to the shaft $o^{VI}$, carrying the change-wheels $o^{VII}$, for obtaining the divisions, and is driven by gears $o^{VIII} o^{IX}$ and friction-plates $o^X$, as in common use on planers, and shown in Figs. 9 and 10.

To the shipper-rod $k'$ is fastened the wedge-piece $r$, moving on the anti-friction roll $t$, supported in the block $t'$, that is rigidly connected to the cutter slide-bed $g$. (Shown in Fig. 3.) The wedge-piece $r$ engages with the feed-tripping latch $r'$, Fig. 8, operated by the spring $r''$. The latch $r'$ is held back by set-screw $r'''$ when it is desired to operate the machine as a "half automatic," or to allow the gear being cut to be revolved part way round for examination.

On the cutter-spindle $s$, Fig. 3, is fixed a gear, $s'$, which, acting through an intermediate with the gear $s''$, operates an endless screw, $s'''$, pivoted on a stud, or otherwise journaled, which by its rotation causes the removal of the chips made by the cutter.

$p$ is the detachable machine spindle or arbor, to which the gear to be cut is secured, as usual, such arbor being driven into the forward end of main spindle $p'$, the latter located in bearings in the top of standard P, as shown in Figs. 1 and 2.

To the rear end of spindle $p'$ is secured the dividing worm-wheel $p''$, driven by worm $p'''$ on shaft $p^{IV}$, by means of interchangeable gears $p^V p^{VI}$ from shaft $o^{VI}$, (shown in Fig. 9,) in the ordinary way.

The gear $o^{VII}$ on spindle $o^{VI}$, by means of train of gears $p^V p^{VI}$, simple or compound, conveys a rotary motion to worm $p'''$ on shaft $p^{IV}$, and the said train of gears is so arranged that one complete revolution of shaft $o^{VI}$ moves the dividing-wheel $p''$ any desired pitch on its arc, as may be required. A pulley, $o^{XII}$, imparts motion to this train of gears by an independent belt from a pulley on the same counter-shaft which drives the machine. The motion of pulley $o^{XII}$, and with it the gears $o^{VIII} o^{IX}$, is continuous, and this device moves the spacing-gears $o^{VII} p^V p^{VI}$ only when the latch $o$ is released from disk $o''$, when the frictional device $o'' o^X$ will move the spacing-gears $o^{VII} p^V p^{VI}$ to impart a spacing motion to the gear-blank that is to be cut.

By means of the combination of parts as above described, when the clutch $f'''$ is being withdrawn from its connection, the cutter-slide can be withdrawn until the index mechanism is caused to revolve, and by holding the cutter-slide in proper position the latch $o$, Fig. 10, will be withheld and the gear-blank allowed to be revolved for examination. Giving the slide a forward motion will cause the latch $o$ to be seated in disk $o''$, when the gear is in right position to continue the cutting without regard to its former position.

The operation of the mechanism is as follows: The gear to be cut having been placed on the machine-spindle $p$, and the cutter on spindle $s$ being set for depth of cut, the feed-dogs $l$ and $l''$, Figs. 3 and 5, are set for the required length of stroke. The clutch $f'''$, Fig. 3, is then connected to gear $f'''$ and the machine set in motion. The feed is then thrown in by moving lever $k$ until the ratchets $h$ and $h''$ are engaged, when slow motion is communicated to the screw, as shown. As the stop $g'''$ strikes the dog $l$ it will at first move simply the feed shipper-rod $k'$ by reason of the slotted connection $k'' k'''$. The slot $k'''$ is made of such length that the ratchets $h$ and $h''$ will not be disengaged until the wedge-piece $r$ has passed by the apex of the tripping-latch $r'$, Figs. 3 and 8, when the spring $r''$ causes the wedge-piece $r$ to be pushed further along until the reverse-motion clutches $h'$ and $h'''$ are engaged and the cutter-slide rapidly returned, these clutches being operated by the lever $k$, through the feed-shaft $f$, by means of the rod $j$, Fig. 4, and pins $j'$, as shown in Figs. 3 and 4. On the return-stroke the stop $g'''$ strikes the part $l'$, Figs. 3 and 6, of the compound dog, which moves the interior index-rod, $k^{IV}$, the spring $r''$ and wedge $r'$ preventing the other parts from moving until the compression of spring $l'''$ has overcome the elasticity of the spring $r''$ and friction of the wedge $r$ and latch $r'$. This movement of the index-rod $k^{IV}$ is communicated, through the crank $m$, Figs. 3 and 4, shaft $m'$, and plates $m''\,m'''$, to the ribbon $m^{IV}$, which moves the index latch-plate $n$, Fig. 10. This, by means of the latch-rod $n''$, gives motion to the arm $n^{VI}$, Figs. 10 and 11, and withdraws the main latch $o$, allowing the friction-gearing shown in Figs. 9 and 10 to drive the dividing mechanism. Before the disk $o''$ has made a complete revolution the movement of the plate $n$ has caused the latch-rod $n''$ to be withdrawn from the arm $n^{VI}$ by means of the roll $n^{IV}$, Figs. 10 and 11, riding up the surface of the cam $n^{V}$, when the spring on the main latch $o$ returns it against the periphery of the disk $o''$ until seated in its notch, when the compound dog $l'\,l''$, Fig. 3, finally moves the feed shipper-rod $k'$ and engages the ratchet-clutches $h\,h''$, as before. On the forward passage of the cutter-slide, the spring $n^{VII}$, Fig. 11, causes the latch-plate $n$ to revolve and return the latch-rod $n''$ to its seat in arm $n^{VI}$.

Having thus fully described the nature, construction, and operation of our invention, we wish to secure by Letters Patent and claim—

1. The combination of the ratchet-clutches $h\,h''\,h'\,h'''$ with the hollow shaft $f$, lever $k$, clutch-rod $j$, pins $j'$ and the gears $e'\,e''$, pinion $e^{IV}$, and pulley $e$, as set forth.

2. The combination of the lever $k$, the hollow slotted shipper-rod $k'$, wedge-block $r$, roll $t$, block $t'$, latch $r'$, and spring $r''$, as set forth.

3. The combination of the compound dog $l'\,l''$, having slot $l^{VIII}$ in part $l''$, spring $l'''$, set-screw or pin $l^{VII}$, with the clamp $l^{IV}$, clamp-screw $l^{VI}$, and index shipper-rod $k^{IV}$, as shown and described.

4. The combination of the index shipper-rod $k^{IV}$ with the crank-arm $m$, shaft $m'$, and adjusting-plates $m''\,m'''$, as shown and described.

5. The combination of the adjusting-plates $m''\,m'''$, ribbon $m^{IV}$, index latch-plate $n$, having lugs $n'$, latch-rod $n''$, arm $n^{VI}$, stud or shaft N, and index-latch $o$, substantially as set forth.

6. The combination of the latch-plate $n$, latch-rod $n''$, arm $n^{VI}$, and index-latch $o$, as set forth.

7. The combination of the latch-plate $n$, latch-rod $n''$, stud-collar $n'''$, roll $n^{IV}$, cam $n^{V}$, and spring $n^{VII}$, as set forth and described.

8. The combination of latch-plate $n$, latch-rod $n''$, stud-collar $n'''$, roll $n^{IV}$, cam $n^{V}$, arm $n^{VI}$, spring $n^{VII}$, with latch $o$, adapted to lock into a recess on disk $o''$, located on shaft $o^{VI}$ and connecting gears to worm-shaft $p^{IV}$, for the purpose of obtaining any desired amount of division on wheel $p''$ by one complete revolution of disk $o''$, as set forth.

In testimony whereof we have affixed our signatures in presence of two witnesses.

AMOS H. BRAINARD.
ZORESTER B. COES.

Witnesses:
JOSHUA WELDER,
HERBERT E. HUNT.